UNITED STATES PATENT OFFICE.

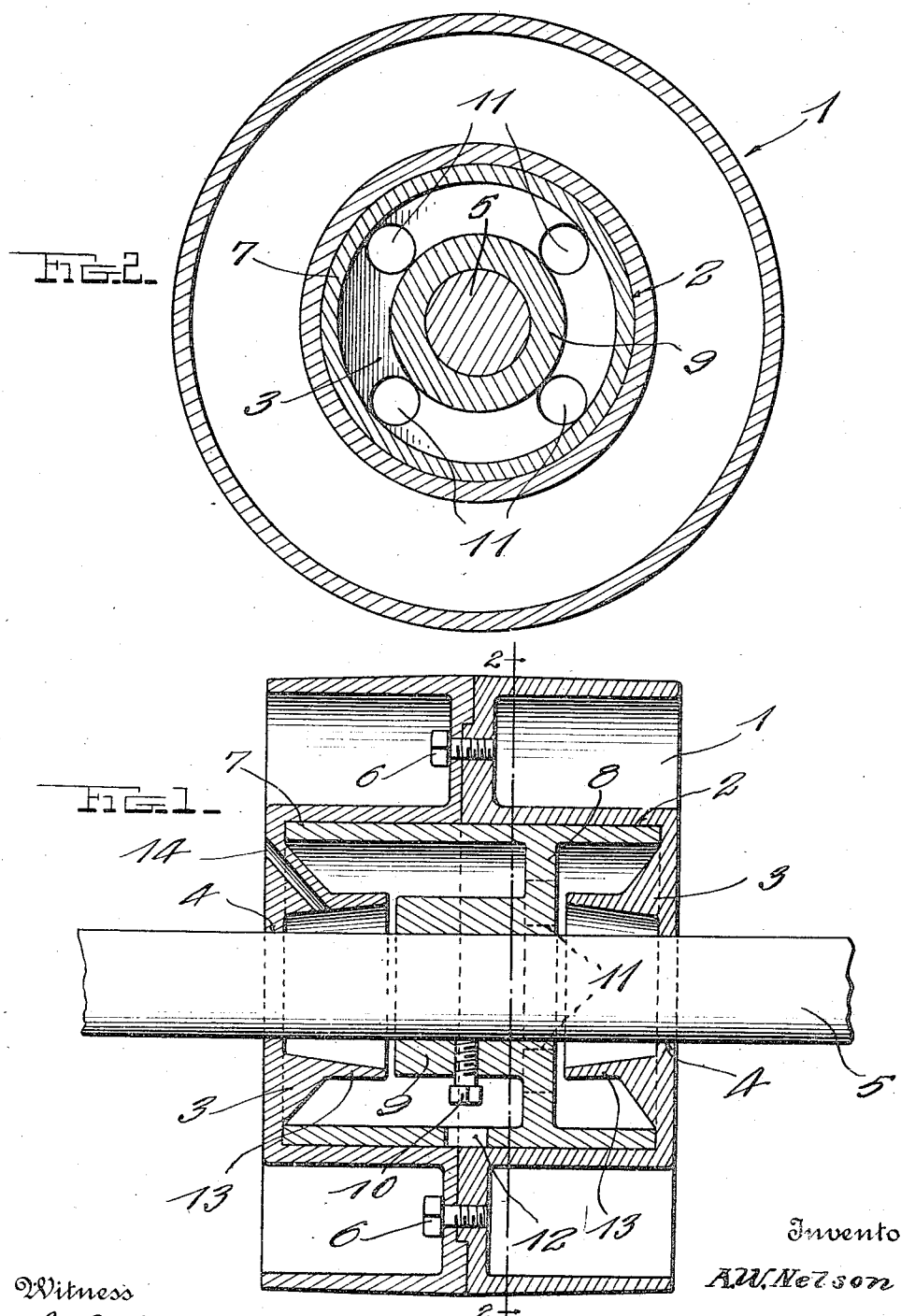

ARTHUR W. NELSON, OF WILLIAMSPORT, PENNSYLVANIA.

LOOSE PULLEY.

1,268,382.        Specification of Letters Patent.      Patented June 4, 1918.

Application filed May 3, 1917. Serial No. 166,226.

*To all whom it may concern:*

Be it known that I, ARTHUR W. NELSON, a citizen of the United States, residing at Williamsport, in the county of Lycoming and State of Pennsylvania, have invented certain new and useful Improvements in Loose Pulleys; and I do declare the following to be a full, clear, and exact description of the invention, such as will enable others skilled in the art to which it appertains to make and use the same.

My invention relates to improvements in loose pulleys and the object is to provide a simple and inexpensive device of this character which will be self-lubricating and will require no plug for the opening by which the hollow hub is supplied with oil.

With the foregoing general object in view, the invention resides in the novel features of construction to be hereinafter fully described and claimed, the descriptive matter being supplemented by the accompanying drawing which forms a part of this specification and in which:

Figure 1 is a longitudinal section of my improved pulley; and,

Fig. 2 is a transverse sectional view thereof on the plane of the line 2—2 of Fig. 1.

In the drawings above briefly described, the numeral 1 designates the pulley proper, said pulley having a hollow cylindrical hub 2 whose opposite ends are provided with integral closures 3 having central openings 4 through which the shaft 5 passes, said hub and the rim of the pulley being preferably formed of two endwise-separable sections secured together by machine screws or the like 6.

A hollow cylindrical bearing 7 is housed within the hub 2 and is in running contact with the wall and ends thereof, said bearing being joined by a web 8 to a hub 9 secured on the shaft 5 by means of a set screw 10 or other suitable means. The web 8 preferably though not necessarily is positioned at one end of the hub 9, but in all cases, said web will be so constructed as to permit oil to pass from one end of the hub 2 into the other, openings 11 being shown in the present form of the invention for this purpose.

In line with the set screw 10, the bearing 7 is formed with an opening 12 through which said set screw is inserted, said opening also serving to conduct oil from the interior of the bearing to the exterior thereof for the purpose of lubricating the contacting cylindrical faces of the hub 2 and said bearing.

The closures 3 are provided on their inner sides with circular flanges 13 which increase gradually in size toward their inner ends and are spaced from the shaft 5, an oil hole 14 being provided in one of said closures for supplying oil to the interior of its respective flange 13.

By constructing the pulley in the manner described, oil may be injected through the oil hole 14 and this oil will strike the shaft 5 and run downwardly thereon until it drips onto the lower portion of the adjacent flange 13. From this flange, the oil will drip onto the hollow bearing 7 and will work around the ends of said bearing and through the opening 12, to thoroughly lubricate the faces of the bearing and hub which are in running contact. It is intended that the oil level shall be lower than the flanges 13 and thus there is no possibility of such oil leaking from the ends of the hub, said flanges serving to prevent the oil from running down the inner sides of the closures 3 and seeping out through the openings 4.

From the foregoing, taken in connection with the accompanying drawing, it will be obvious that although my invention is of extremely simple and inexpensive nature it will be highly efficient and durable, particular emphasis being laid upon the thorough manner of lubrication and upon the fact that no closure is necessary for the oil hole 14 in order to prevent the oil from leaking therethrough. Since probably the best results are obtained from the specific construction shown and described, this construction constitutes the preferred form of the pulley. It is to be understood, however, that within the scope of the invention as claimed, numerous minor changes may be made without sacrificing the principal advantages. Furthermore, I wish it understood that although the features of novelty herein described and claimed are disclosed in connection with a pulley, they could well be employed in other relations, for instance as a shaft bearing, in which case the hub 2 would be non-rotatable.

I claim:—

A self-lubricating loose pulley comprising a hollow cylindrical hub, closures on the ends of said hub having openings to receive a pulley shaft, a hollow open-ended cylindrical bearing positioned in said hub in running contact with the wall thereof, said bearing having a hub adapted to be attached to said shaft, a web extending between said bearing and its hub, a pair of inwardly extending flanges formed integral with said closures and surrounding said shaft in spaced relation thereto, said flanges increasing in diameter toward their inner ends, the inner ends of said flanges being disposed in closely spaced relation with said bearing hub and one of said closures having an oil hole extending through its flange, said flanges providing means for preventing the oil from escaping out along the shaft.

In testimony whereof I have hereunto set my hand in the presence of two subscribing witnesses.

ARTHUR W. NELSON.

Witnesses:
M. F. WILSON,
ELLEN A. REODIUS.

Copies of this patent may be obtained for five cents each, by addressing the "Commissioner of Patents, Washington, D. C."